United States Patent
Yamada (10) Patent No.: US 8,793,234 B2
(45) Date of Patent: *Jul. 29, 2014

(54) DATABASE MANAGEMENT METHOD (71) Applicant: Murakumo Corporation, Tokyo (JP)

(72) Inventor: Hiroyuki Yamada, Tokyo (JP)

(73) Assignee: Murakumo Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,203

(22) Filed: Mar. 4, 2013

(65) Prior Publication Data

US 2013/0185255 A1 Jul. 18, 2013

Related U.S. Application Data (63) Continuation of application No. 13/513,773, filed as application No. PCT/JP2011/068057 on Aug. 8, 2011.

(30) Foreign Application Priority Data

Oct. 26, 2010 (JP) .................................. 2010-239713

(51) Int. Cl.
*G06F 17/30* (2006.01)
(52) U.S. Cl.
CPC .... *G06F 17/30289* (2013.01); *G06F 17/30008* (2013.01); *G06F 17/30345* (2013.01)
USPC .......................................... 707/703; 707/615
(58) Field of Classification Search
None
See application file for complete search history.

(56) References Cited

U.S. PATENT DOCUMENTS

| 2012/0011098 A1 | 1/2012 | Yamada |
| 2012/0297487 A1 | 11/2012 | Xia |
| 2013/0013556 A1 | 1/2013 | Yamada |
| 2013/0179416 A1 | 7/2013 | Yamada |

FOREIGN PATENT DOCUMENTS

| JP | 2001-319012 A | 11/2001 |
| JP | 2002-149459 A | 5/2002 |
| JP | 2006-293910 A | 10/2006 |
| JP | 2007-264685 A | 10/2007 |
| WO | 2010/106991 A1 | 9/2010 |

OTHER PUBLICATIONS

U.S. Non-Final Office Action dated Sep. 18, 2013, issued in related U.S. Appl. No. 13/784,244 (11 pages).
U.S. Non-Final Office Action dated Sep. 18, 2013, issued in related U.S. Appl. No. 13/784,254 (11 pages).
International Search Report of PCT/JP2011/068057, mailing date of Aug. 30, 2011.
U.S. Non-Final Office Action dated Apr. 11, 2014, issued in related U.S. Appl. No. 13/784,288 (23 pages).
U.S Notice of Allowance dated Feb. 19, 2014, issued in related U.S. Appl. No. 13/784,254 (13 pages).
U.S. Non-Final Office Action dated Feb. 12, 2014, issued in related U.S. Appl. No. 13/784,272 (19 pages).
U.S. Notice of Allowance dated Feb. 5, 2014, issued in related U.S. Appl. No. 13/784,244 (12 pages).

*Primary Examiner* — Belix M Ortiz Ditren
(74) *Attorney, Agent, or Firm* — Westerman, Hattori, Daniels & Adrian, LLP (57) ABSTRACT

A lower-level master node sends, to a higher-level master node, a write set expanded in its own memory including a shadow copy of its own database and a heap tuple map, and the higher-level master node that received the write set verifies whether the update has already been executed and sends the record of this update to the lower-level master node as a transaction log, whereby the database can be updated efficiently and consistently from the lower-level master node to the higher-level master node, and from the higher-level master node to the lower-level master node under its control.

2 Claims, 6 Drawing Sheets

| XB1 | D14 | U157 | XC1 | |

DATABASE MANAGEMENT METHOD

CROSS-REFERENCE TO RELATED APPLICATION

This application is a Continuation Application of U.S. Ser. No. 13/513,773, filed Jun. 4, 2012, which is a U.S. National Stage filing under 35 U.S.C. 371 of PCT International Application No. PCT/JP2011/068057, filed on Aug. 8, 2011. The entire contents of each of the above documents in hereby incorporated by reference into the present application.

FIELD

The present invention relates to a database management method, and in particular relates to a method of managing a database in which a plurality of master nodes are hierarchically connected by a network.

BACKGROUND

The present applicant took particular note of the technology of managing a database using a transaction log, and proposed a data synchronization method based on a one-to-one master/slave system in Japanese Patent Application Publication No. 2006-293910, and subsequently proposed a data synchronization method based on a one-to-N (wherein N is a positive integer) master/slave system in PCT/JP2010/054311 (hereinafter referred to as the "Earlier Unpublished Application").

Here, a transaction log refers to the technology of realizing high-speed operations while maintaining the permanence of changes by recording the history of changes made to the database in an area that is different from the recording area of the database.

In particular, Japanese Patent Application Publication No. 2006-293910 focused on realizing a replication system by using a transaction log, and, with the Earlier Unpublished Application, a slave node that received a search command from a client sends a request message to a master node, the slave node requests the master node to send a transaction log up to the latest version of the update of the master database when the slave node does not receive a return message from the master node within a predetermined time, the master node that received the foregoing request sends the requested transaction log to the slave node, and the slave node refers to the received log and updates its own replica database.

SUMMARY

Meanwhile, the Earlier Unpublished Application was based on the premise of being a network configuration in which its node configuration comprises a plurality of mirror nodes to one master node.

Thus, since the mirror node would never independently execute data update instructions (INSERT, UPDATE, DELETE), the slave node only had to update its own database by referring to the transaction log from the master node.

Meanwhile, pursuant to the diversity and complexity of databases, a so-called multi master system comprising a plurality of master nodes is attracting attention. With respect to this point, in a network configuration where the master nodes have symmetric properties (when the master nodes are of a parallel structure), proposed is a theory of prioritizing the update information among the master nodes, and synchronizing the master nodes. However, the procedures for synchronizing all nodes are complex, and the solution during contention was not realistic.

The present inventors devised the present invention in light of the foregoing circumstances. Thus, the technical object of this invention is to realize a database management method capable of hierarchically building the master nodes, and using such hierarchical structure to reliably and efficiently update the nodes.

The present invention adopted the following measures to achieve the foregoing object.

According to an aspect of the present invention is a method of managing a database which is a recordable database hierarchically including higher-level and lower-level master nodes in which records can be updated, comprising: a step of a database processing unit of any one of lower-level master nodes generating and sending, to a higher-level master node, a write set expanded in its own memory including a shadow copy of a database and a heaptuple map, when an instruction for updating the database is issued in the lower-level master node; a step of the higher-level master node comparing the heaptuple map in the write set received from the lower-level master node and its own database, and verifying whether a corresponding line of the database registered as a target has been updated by a different write set; a step of aborting the write set when the update has been performed, updating its own database using the shadow copy when the update has not been performed, and generating a record of this update as a transaction log; a step of distributing the transaction log to the lower-level master nodes including the lower-level master node which has sent the write set; and a step of a transaction log processing unit of the lower-level master node updating its own database based on the received transaction log.

According to another aspect of the present invention is the method of managing a database, wherein the shadow copy of the write set in the lower-level master node is configured only from newly added lines.

According to another aspect of the present invention is the method of managing a database, wherein, in a stage where the write set is being generated in the lower-level master node, if search processing is performed on a master database of that lower-level master node, the method executes: a step of the database processing unit of the lower-level master node referring to the master database; and a step of referring to the heaptuple map one line at a time to determine whether the corresponding line number has been entered in the search processing, setting the master database as a direct search target when the corresponding line number has not been entered, and, when the corresponding line number has been entered, determining whether the entry is a deletion command or an update command, and removing the corresponding line number from the search target when the entry is the deletion command, and setting the entry of the shadow copy in the heaptuple map as the search target when the entry is the update command.

According to another aspect of the present invention is the method of managing a database, wherein, in a stage where the write set is being generated in the lower-level master node, if search processing is performed on a master database of that lower-level master node, the method executes: a step of the database processing unit of the lower-level master node referring to the master database; a step of referring to the whole heaptuple map, extracting entries of line numbers to be the search target, and removing the all entered line numbers from the search target on the assumption that the line numbers have been deleted; and a step of referring to the shadow copy, referring to line numbers of entries that have been added in the shadow copy, and setting only those line numbers as the search target.

According to another aspect of the present invention is the method of managing a database, wherein, when the write set is generated in the lower-level master node, an area of a backend memory (BEM) in the lower-level master node for registering the write set can be referred to at least by the transaction log processing unit which executes an update instruction based on the transaction log distributed from the higher-level master node, and when the transaction log processing unit refers to the backend memory (BEM) and if a corresponding line to be updated based on the update instruction is contained in the heaptuple map (HTM) of the write set, the transaction log processing unit aborts the transaction that is generating that heaptuple map (HTM).

According to another aspect of the present invention is a database management method of a higher-level master node in a recordable database hierarchically including master nodes, comprising: a step of a higher-level master node receiving a write set generated by a database processing unit of any one of lower-level master nodes from a shadow copy of a database and a heaptuple map expanded in its own memory, when an instruction for updating the database is issued in the lower-level master node; a step of the higher-level master node comparing the heaptuple map in the received write set and its own database, and verifying whether a corresponding line of the database registered as a target has been updated by a different write set; and a step of aborting the write set when the update has been performed, and updating its own database using the shadow copy when the update has not been performed.

According to another aspect of the present invention is the database management method of a higher-level master node, wherein the higher-level master node receives, as the write set, the shadow copy which is configured only from newly added lines in the lower-level master node.

According to another aspect of the present invention is a database management method of a lower-level master node in a recordable database hierarchically including higher-level and lower-level master nodes in which records can be updated, comprising: a step of a database processing unit of any one of lower-level master nodes generating, for a higher-level master node, a write set expanded in its own memory including a shadow copy of a database and a heaptuple map, when an instruction for updating the database is issued in the lower-level master node, a step of sending the write set to the higher-level master node for causing the higher-level master node to compare the heaptuple map in the write set received from the lower-level master node and its own database, to verify whether a corresponding line of the database registered as a target has been updated by a different write set, to abort the write set when the update has been performed, to update the database of the higher-level master node using the shadow copy when the update has not been performed, to generate a record of this update as a transaction log, and to distribute the transaction log to the lower-level master nodes including the lower-level master node which has sent the write set; and a step of a transaction log processing unit of the lower-level master node updating, upon receiving the transaction log, its own database based on the received transaction log.

According to another aspect of the present invention is the database management method of a lower-level master node, wherein the shadow copy of the write set in the lower-level master node is configured only from newly added lines.

According to another aspect of the present invention is the method of managing a database, wherein, in a stage where the write set is being generated in the lower-level master node, if search processing is performed on a master database of that lower-level master node, the method executes: a step of the database processing unit of the lower-level master node referring to the master database; and a step of referring to the heaptuple map one line at a time to determine whether the corresponding line number has been entered in the search processing, setting the master database as a direct search target when the corresponding line number has not been entered, and, when the corresponding line number has been entered, determining whether the entry is a deletion command or an update command, and removing the corresponding line number from the search target when the entry is the deletion command, and setting the entry of the shadow copy in the heaptuple map as the search target when the entry is the update command.

According to another aspect of the present invention is the method of managing a database, wherein, in a stage where the write set is being generated in the lower-level master node, if search processing is performed on a master database of that lower-level master node, the method executes: a step of the database processing unit of the lower-level master node referring to the master database; a step of referring to the whole heaptuple map, extracting entries of line numbers to be the search target, and removing the all entered line numbers from the search target on the assumption that the line numbers have been deleted; and a step of referring to the shadow copy, referring to line numbers of entries that have been added in the shadow copy, and setting only those line numbers as the search target.

According to another aspect of the present invention is the method of managing a database, wherein, when the write set is generated in the lower-level master node, an area of a backend memory (BEM) in the lower-level master node for registering the write set can be referred to at least by the transaction log processing unit which executes an update instruction based on the transaction log distributed from the higher-level master node, and when the transaction log processing unit refers to the backend memory (BEM) and if a corresponding line to be updated based on the update instruction is contained in the heaptuple map (HTM) of the write set, the transaction log processing unit aborts the transaction that is generating that heaptuple map (HTM).

According to the present invention, multi master nodes are hierarchically built, a shadow copy and a heap tuple map expanded in its own memory are sent as a write set from a lower-level master node to a higher-level master node, the higher-level master node that received the foregoing write set verifies whether the relevant row has been previously updated by a different write set, and performs database update processing by using the shadow copy and heap tuple map if the relevant row has not been updated. In addition, as a result of the higher-level master node sending the record of this update as a transaction log to the lower-level master node, the database can be updated efficiently and consistently from the lower-level master node to the higher-level master node, and from the higher-level master node to the lower-level master node under its control.

DESCRIPTION OF EMBODIMENTS

The present invention is now explained with reference to the appended drawings.

Figure 1:
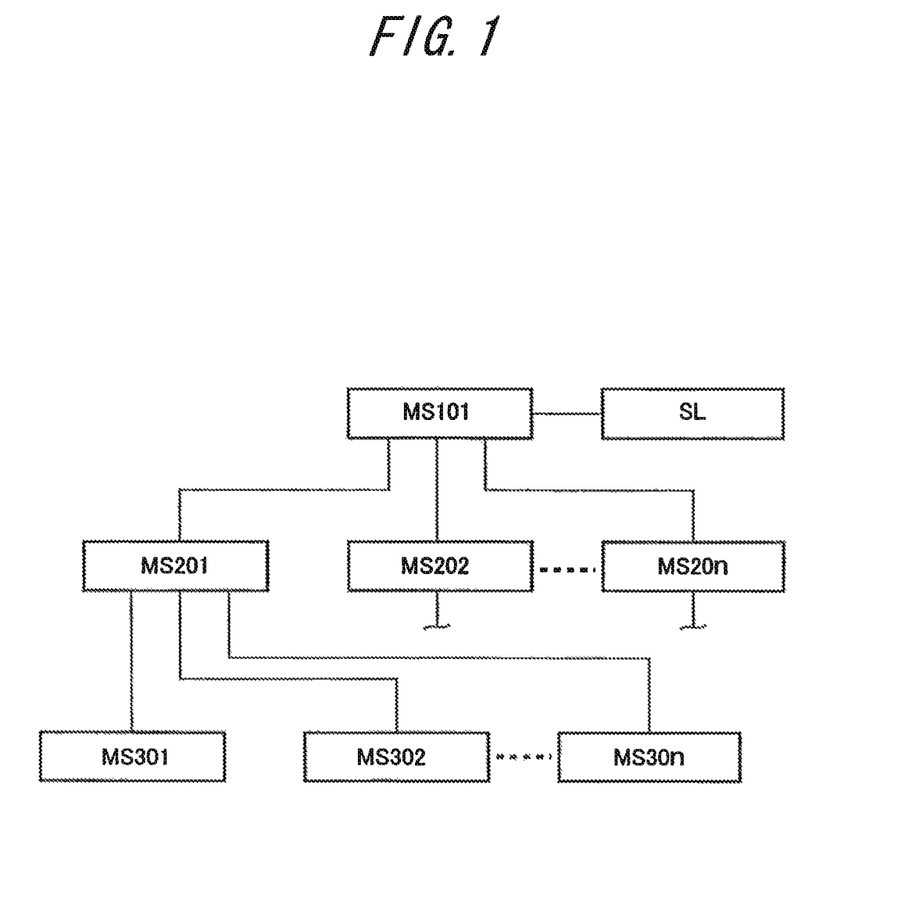
FIG. 1 is a conceptual diagram showing the database structure of the hierarchical master nodes according to an embodiment of the present invention.

FIG. 1 shows the structure of the hierarchical master nodes of this embodiment. As shown in FIG. 1, the node configuration where lower-level master nodes (MS201, MS202, ..., MS20n and MS301, MS302, ..., MS30n) are hierarchically provided below a higher-level master node (MS101) is adopted. Each node (information processing apparatus) includes a database. Moreover, the higher-level master node (MS101) includes a slave, and the other lower-level master nodes may also include a slave. With this kind of master/slave configuration, the update management technology of PCT/JP2010/054311 (Earlier Unpublished Application by the present applicant) may be applied for updating the databases between the master node and the slave.

While the foregoing Earlier Unpublished Application only needs to copy (replicate) the transaction log data of the master node to the lower-level nodes, this embodiment is unique in that attention was focused on the fact that, with a configuration of hierarchical multi master nodes, when an update instruction is also being executed in the lower-level master nodes, the consistency of all lower-level nodes cannot be maintained only by referring to the transaction log from the higher-level node. This is explained below.

Figure 2:
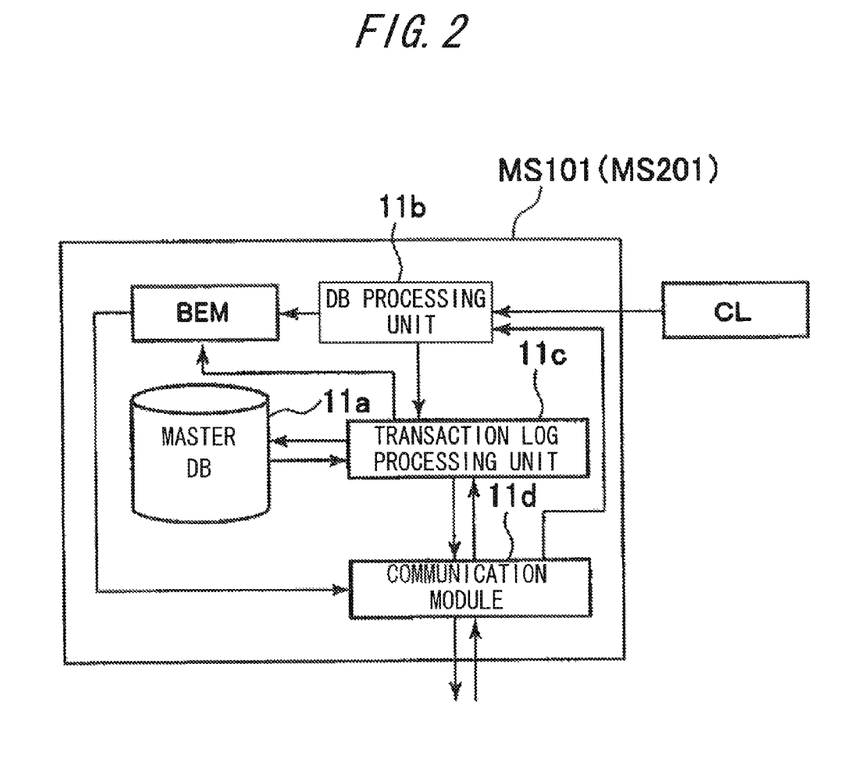
FIG. 2 is a functional block diagram of the master node of the foregoing embodiment.

FIG. 2 is a functional block diagram of the lower-level master node (MS201), and the higher-level master node (MS101) also has similar functions.

Figure 4:
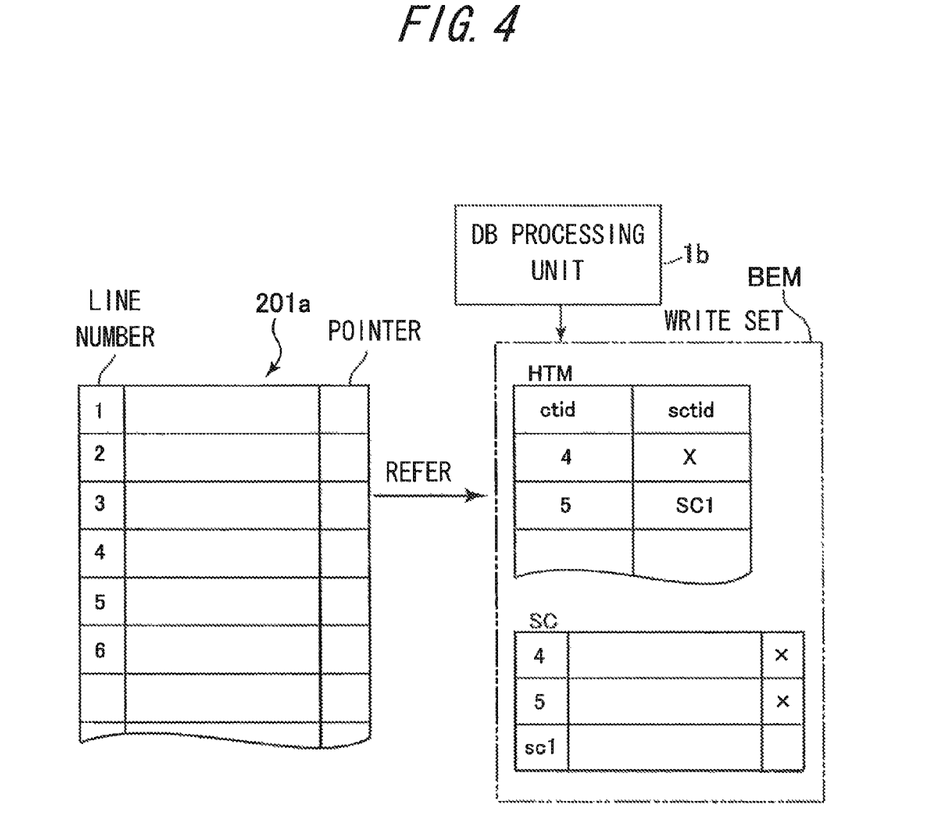
FIG. 4 is a diagram showing the relationship between the page of the database of the lower-level master node of the foregoing embodiment and the generated write set (heap tuple map (HTM) and shadow copy (SC))

As shown in FIG. 2, when an instruction for updating the database is input from a client (CL), a database processing unit (11b) generates a write set in a backend memory (BEM) created in a main memory (MM). This write set is configured from a heap tuple map (HTM) and a shadow copy (SC) as shown in FIG. 4. Here, let it be assumed that update instructions for deleting (DELETE) row number 4 of a master database (101a) and rewriting (UPDATE) row number 5 with a new value (sc1) were input.

Here, the database processing unit 11b sends the write set, which was generated in the backend memory (BEM), to the higher-level master via a communication module (11d) without directly writing data into a master database (11a) while referring to the master database (11a).

This kind of processing is performed in the higher-level master node (MS101), as well as in the lower-level master nodes (MS201, MS202, ..., MS20n and MS301, MS302, ..., MS30n).

Figure 3:
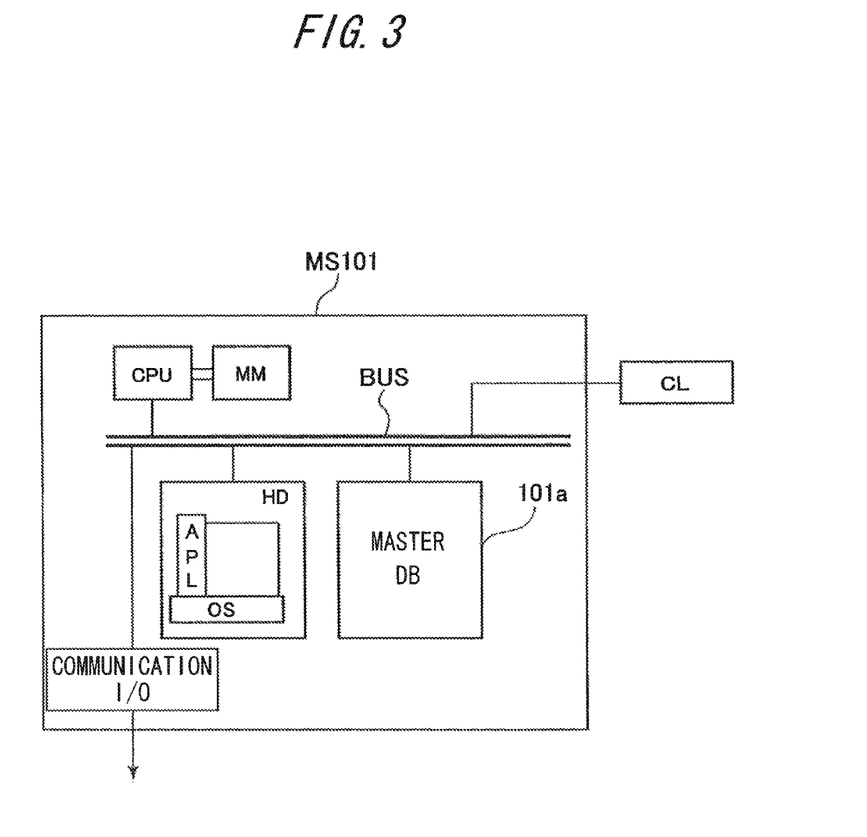
FIG. 3 is a hardware block diagram of the master node of the foregoing embodiment.

FIG. 3 shows the hardware configuration for realizing the foregoing functions. The higher-level master node (MS101) is a general purpose information processing apparatus, and includes a large-scale hard drive (HD), a master database (11a), and a communication interface (I/O) (communication module 11d) for communicating with the outside which are connected via a bus (BUS) around a central processing unit (CPU) and a main memory (MM). Note that a client terminal (CL) is connected via the bus (BUS) or the communication interface (I/O) for receiving instructions.

The large-scale hard drive (HD) stores an operating system (OS) as well as application programs (APL), and the functions as the foregoing master node are realized by the central processing unit (CPU) reading and sequentially executing the programs via the bus (BUS) and the main memory (MM). Note that, although the explanation is omitted, the lower-level master nodes (MS201, MS202, ..., MS20n and MS301, MS302, ..., MS30n) are also configured the same.

The processing performed by the database processing unit (11b) explained with reference to FIG. 2 is now explained in detail with reference to FIG. 4.

FIG. 4 shows the relationship of the master database (11a) in the lower-level master node (MS201), and the write set. The master database (201a) is configured from row numbers, instructions, and a pointer and is a recordable database in which a row number is added each time a new instruction is given from the client terminal (CL). FIG. 4 shows the case explained above where row number 4 is deleted (DELETE) and row number 5 is rewritten according to the new instruction (UPDATE to sc1).

In the lower-level master node (MS201), when this kind of update instruction is given to the master database based on instructions from the client terminal (CL), as described above, a write set configured from a heap tuple map (HTM, heap file) and a shadow copy (SC) is generated in the backend memory (BEM).

The original row number (ctid) and the row number (sctid) of the new row are associated and registered in the heap tuple map (HTM). The heap tuple map (HTM) is additionally generated each time the database is updated. Note that, since the row number to which the instruction (sc1) of row number 5 is to be written is still unknown at this stage, a new instruction (sc1) is written in sctid.

Meanwhile, the shadow copy of the row number to be rewritten by referring to the master database (11a) is generated in the shadow copy (SC). Here, since the row number to be newly added is still unknown at this stage, a new instruction (sc1) is written in the row number.

Note that, at this stage, since the database processing unit (11b) of the lower-level master node (MS201) knows that row number 4 to which the DELETE instruction is applied and old row number 5 to which the UPDATE instruction is applied will be deleted based on the generation of the heap tuple map (HTM), it is also possible to only write the new instruction (sc1) as the shadow copy (SC).

The write set generated as described above is sent from the lower-level master node (MS201) to the higher-level master node (MS101).

Figure 5:
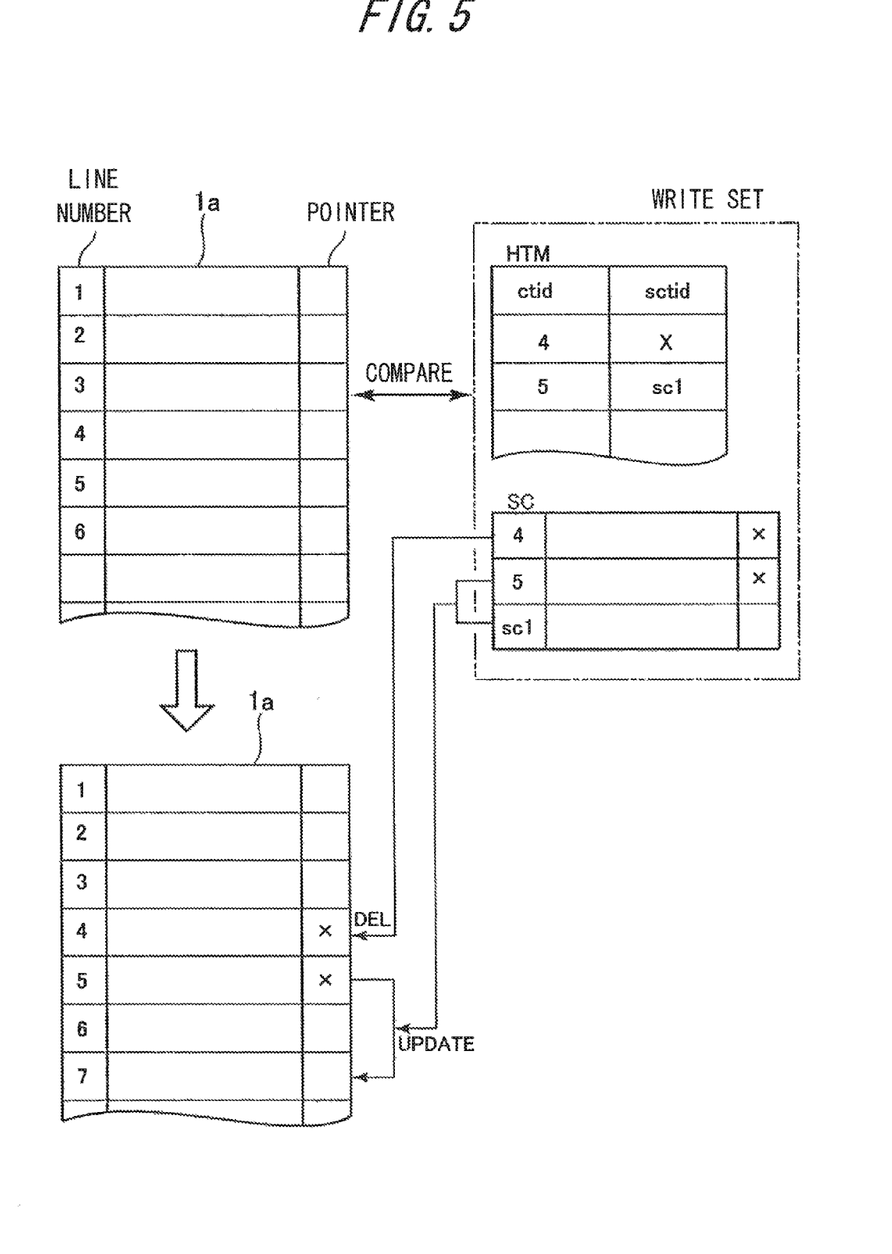
FIG. 5 is an explanatory diagram upon updating the higher-level master node by using the write set sent from the lower-level master node in the foregoing embodiment.

In the higher-level master node (MS101), when the database processing unit 11b (central processing unit (CPU)) receives the write set from the lower-level master node (MS201), it activates the transaction log processing unit (11c) pursuant to the update instruction and starts the generation of transaction log data. In addition, the database processing unit 11b reads the heap tuple map (HTM) from the received write set, and compares it with its own master database (11a). Here, whether the contents of the target tuples (row numbers 4, 5 and 7 in this case) have been updated in the master database (11a) is verified. In FIG. 5, since row numbers 4 to 6 have not yet been updated, a deletion pointer is given to row number 4, and a deletion pointer is also given to old number 5 to be rewritten. In addition, a new instruction (sc1) is written in new row number 7.

Meanwhile, upon comparing the heap tuple map (HTM) in the write set from the lower-level master node (M201) and its own database, if the relevant row has already been updated in higher-level master node (M201) based on a different write set, the processing based on that write set is aborted (stopped).

Figure 6:
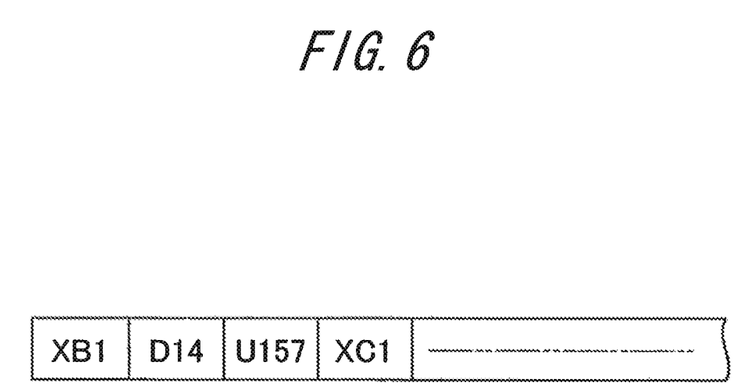
FIG. 6 is a diagram showing the transaction log that is generated by the higher-level master node.

FIG. 6 shows an example of the transaction log data that is generated by the transaction log processing unit (11c) when the master database (11a) of the higher-level master node (MS101) is updated as described above. This transaction log is a file in which at least the instruction and transaction (row number and the processing executed thereto) are sequentially recorded in a time series.

According to FIG. 6, subsequent to the instruction (XB1) for starting the transaction, a log in which the instruction number and the row number configuring a part is being generated sequentially. For example, row number 4 is foremost deleted (D14) as the DELETE instruction (D1), row number 5 is subsequently deleted as the UPDATE instruction (U1), row number 7 is added (U157), and, finally, the commitment instruction (XC1) thereof is issued.

This transaction log data is distributed from the communication module (11d) to the lower-level master node (MS201) which has sent the write set, as well as to all lower-level master nodes (MS202, . . . , MS20n and MS301, MS302, . . . , MS30n).

The lower-level master nodes that received the transaction log data copy (replicate) such transaction log data in their own database.

Specifically, when a lower-level master node (M202, for instance) receives the transaction log data shown in FIG. 6 with the communication module (11d), it activates the transaction log processing unit (11c) and replicates the transaction log data in its own master database (11a). Consequently, a deletion pointer is given to row numbers 4 and 5, and a new row number 7 is added.

Accordingly, in the lower-level master nodes, the databases are uniformly managed by replicating the transaction log data sent from the higher-level master node.

The present invention was explained above based on an embodiment, but the present invention is not limited thereto. Modified examples of the present invention are explained below.

(Case Where the Database is Updated in the Higher-Level Master Node MS101)

With respect to the processing in a case where an update instruction of a master database is issued in a lower-level master node (MS201, for instance), as explained in FIG. 2, a write set configured from a heap tuple map (HTM, heap file) and a shadow copy (SC) is generated in a backend memory (BEM). However, when an update instruction of a master database is issued in a higher-level master node (MS101), a write set is not generated since it is not necessary to notify a higher-level node. That is, in the foregoing case, with the higher-level node (MS101), as shown in the left diagram of FIG. 5, update data is directly written into the master database (11a), and the transaction log data shown in FIG. 6 is generated. This transaction log data is distributed to the lower-level master nodes, and the lower-level master nodes that received the transaction log data replicate such transaction log data in their own master database.

(When Search Processing is Executed at the Stage Where the Lower-Level Master Node is Generating a Write Set)

In the lower-level master node (MS201, for example), when a search is executed to the master database of that lower-level master node at the stage when a write set is being generated as shown in FIG. 4, there will be no problem if the search is targeting a row number other than the row number in which the write set was generated. However, if the search is targeting the corresponding row (row number 4 and row number 5 in this example), they cannot be used as the search target since these row numbers have already been deleted.

The following two measures may be considered in the foregoing case.

The first type is where the database processing unit (11b) refers to the master database (11a), and thereafter refers to the heap tuple map (HTM). In addition, whether the search target row number has been entered in the heap tuple map (HTM) is checked. If there is such an entry, whether that entry is a deletion or update is determined, and, if the entry is an update, the shadow copy (SC) is referred to and the entry (sc1) of that shadow copy (SC) is set as the search target. For example, in the case shown in FIG. 4, when the search target is row number 3, the database processing unit (11b) refers to the heap tuple map (HTM) in the write set in the backend memory (BEM) built in the main memory (MM), and determines whether the corresponding row (row number 3) has been entered. In the example of FIG. 4, the corresponding row has not been entered. In the foregoing case, the database processing unit (11b) directly accesses the master database 201a and searches the corresponding row (row number 3).

Meanwhile, if the search target is row number 4 in the example shown in FIG. 4, the database processing unit (11b) detects that the corresponding row (row number 4) has been entered upon referring to the heap tuple map (HTM) in the write set. In the foregoing case, even if the master database 201a is accessed, since the remaining corresponding row is already a target of the update instruction for deletion, it cannot become a search target. The database processing unit (11b) refers to the heap tuple map (HTM) and detects that the corresponding row (row number 4) has been deleted. Accordingly, since the search target row has been deleted, the database processing unit (11b) does not set the corresponding row as the search target.

Meanwhile, in the example shown in FIG. 4, if the search target is row number 5, as described above, the database processing unit (11b) refers to the heap tuple map (HTM) and detects that the shadow copy (sc1) corresponding to the corresponding row (row number 5) has been created.

Here, the database processing unit (11b) may refer to the shadow copy (SC) and set the entry (sc1) which rewrote the row number 5 as the search target.

The second type is here the database processing unit (11b) foremost refers to the master database (11a), and thereafter refers to the overall heap tuple map (HTM). Here, whether the row to be searched has been entered is checked, and it is assumed that all entered row numbers (row numbers 4 and 5 in this case) have been deleted (to be excluded from the search target). Subsequently, the database processing unit 11b refers to the shadow copy (SC), and refers to the entry (sc1) that was added in the shadow copy and sets this as the search target.

(When Contention Occurs while Update of the Lower-Level Master is Being Performed with the Transaction Log Data from the Higher-Level Master)

When an instruction for updating the database of the lower-level master is being executed to the corresponding row while replication is being performed on the database of the lower-level master node based on the transaction log data distributed from the higher-level master, contention will occur.

Specifically, a corresponding case would be when transaction log data including an entry of row number 5 is distributed from the higher-level master while row numbers 4 and 5 are being updated based on the update instruction to the lower-level master node.

In the foregoing case, even if the write set created in the lower-level master node is sent to the higher-level master node, since the transaction log data relating to the corresponding row has already been distributed to the higher-level master node, the write set is aborted since contention with the higher-level master node is detected. Accordingly, contention in that lower-level master node may be ignored.

Meanwhile, as another method of resolving the contention in the lower-level master nodes, when a write set (heap tuple map (HTM) and shadow copy (SC)) is created in a lower-level master node, these may be registered in a backend memory (BEM) of that lower-level master node so that these areas can be referred to from two or more processes (specifically, the replication process and the write set generation process). In other words, in the lower-level master node, desirably the write set, and more specifically only the heap tuple map (HTM) is stored in the shared memory.

In the foregoing case, as a result of referring to the write set in the backend memory (BEM) upon the lower-level master node executing the replication of the master database 11a, the write set that contradicts the update instruction can be aborted at the stage of the lower-level master node. Specifically, the transaction log processing unit 11c refers to the backend memory (BEM), and aborts the transaction that is generating the heap tuple map (HTM) when the corresponding row to be updated based on the update instruction is contained in that heap tuple map (HTM).

Accordingly, by storing the heap tuple map (HTM) in a shared memory and enabling the referral thereof from a plurality of processes, contention can be prevented at the stage of the lower-level master node even in a multi master system database. In addition, since only the heap tuple map (HTM) needs to be stored in the shared memory, it will not occupy the valuable shared memory.

The present invention can be applied to a data management system of a multi master node structure comprising a hierarchical structure.

What is claimed is:

1. A database management method of a higher-level master node in a recordable database hierarchically including master nodes, comprising:
   receiving, by a higher-level master node, a write set generated by a database processing unit of any one of lower-level master nodes from a shadow copy of a database and a heap tuple map expanded in a memory for the database processing unit, when an instruction for updating the database is issued in the lower-level master node;
   comparing, by the higher-level master node, the heap tuple map in the received write set and the database of the higher-level master node, and verifying, by the higher-level master node, whether a corresponding row of the database registered as a target has been updated by a different write set; and
   aborting the write set when the update has been performed, and updating the database of the higher-level master node using the shadow copy when the update has not been performed.

2. The database management method of a higher-level master node according to claim 1,
   wherein the higher-level master node receives, as the write set, the shadow copy which is configured only from newly added rows in the lower-level master node.

* * * * *